(12) United States Patent
Okada

(10) Patent No.: US 9,377,855 B2
(45) Date of Patent: Jun. 28, 2016

(54) PORTABLE TERMINAL DEVICE

(71) Applicant: KYOCERA Corporation, Kyoto-shi, Kyoto (JP)

(72) Inventor: Shinya Okada, Shijonawate (JP)

(73) Assignee: KYOCERA Corporation, Kyoto (JP)

( * ) Notice: Subject to any disclaimer, the term of this patent is extended or adjusted under 35 U.S.C. 154(b) by 26 days.

(21) Appl. No.: 13/846,017

(22) Filed: Mar. 18, 2013

(65) Prior Publication Data

US 2013/0257800 A1 Oct. 3, 2013

(30) Foreign Application Priority Data

Mar. 28, 2012 (JP) .................................. 2012-072881

(51) Int. Cl.
G06F 3/01 (2006.01)

(52) U.S. Cl.
CPC ....................................... G06F 3/016 (2013.01)

(58) Field of Classification Search
CPC ....... G06F 3/044; G06F 3/045; G06F 3/0488; G06F 3/04883; G06F 3/04886; G06F 3/016; G06F 2203/04106; G06F 3/0414; G06F 3/0433; G06F 1/1662; G06F 1/1664; G06F 3/0202; G06F 3/0216; G06F 3/0219; G06F 3/0237; G06F 1/1626; G06F 3/03547; G06F 3/041; G06F 1/164
USPC .......... 345/173–179, 158, 156, 168; 715/810, 715/835, 840; 178/18.01–18.06
See application file for complete search history.

(56) References Cited

U.S. PATENT DOCUMENTS

| | | | |
|---|---|---|---|
| 2008/0144964 A1* | 6/2008 | Soinio et al. ................... | 382/275 |
| 2008/0216578 A1* | 9/2008 | Takashima et al. ............. | 73/658 |
| 2009/0015555 A1* | 1/2009 | Takashima et al. ............ | 345/158 |
| 2010/0020036 A1* | 1/2010 | Hui et al. ....................... | 345/173 |
| 2010/0175008 A1* | 7/2010 | Han et al. ....................... | 715/764 |
| 2011/0138275 A1* | 6/2011 | Yu ................................. | 715/702 |
| 2011/0163984 A1* | 7/2011 | Aono ............................ | 345/173 |

FOREIGN PATENT DOCUMENTS

| | | |
|---|---|---|
| JP | 2001-022267 A | 1/2001 |
| JP | 2005-202545 A | 7/2005 |

(Continued)

OTHER PUBLICATIONS

"A Fingernail-Mounted Tactile Presentation Device (Smart Finger)", URL://www.-hiel.ist.osaka-u.ac.jp/japanese/exp/smart_finger.html, Dec. 26, 2011.

(Continued)

*Primary Examiner* — Md Saiful A Siddiqui
(74) *Attorney, Agent, or Firm* — Procopio, Cory, Hargreaves & Savitch LLP

(57) ABSTRACT

A portable terminal device and methods are disclosed A portable terminal comprises: a touch panel that detects a position of a touch, if an operator touches a display unit displaying an image, and outputs the position of the touch; a vibrator; an edge detector that detects an edge in the image; and a controller that determines whether the position of the touch corresponds with a position of the detected edge, causes the vibrator to start vibrating if the position of the touch corresponds with the position of the edge, and inhibits the vibrator from vibrating if the position of the touch does not correspond with the position of the edge.

6 Claims, 10 Drawing Sheets

(56) References Cited

FOREIGN PATENT DOCUMENTS

| | | |
|---|---|---|
| JP | 2005-267080 A | 9/2005 |
| JP | 2009-020759 A | 1/2009 |
| JP | 2011/062895 A2 | 3/2011 |
| JP | 2011-146821 A | 7/2011 |
| JP | 2012-043359 A | 3/2012 |

OTHER PUBLICATIONS

Suzuki et al., "The Tactile Display for Active Touch using the Vibration Touch Panel", Proceedings of the Virtual Reality Society of Japan Annual Conference vol. 14, Sep. 2009.

Office Action dated Sep. 1, 2015, issued by Japanese Patent Office for Japanese Application No. 2012-072881.

* cited by examiner

FIG. 3

Edge information table  120

| Edge information piece | |
|---|---|
| Start position (x coordinate, y coordinate) | End position (x coordinate, y coordinate) |
| (100, 110) | (200, 210) |
| (200, 210) | (250, 300) |
| (250, 300) | (410, 550) |
| (710, 110) | (800, 120) |
| ⋮ | ⋮ |

121 — (left of first data row); 122 — (right of first data row)

Actual surface

Sensed surface

PORTABLE TERMINAL DEVICE

This application is based on an application No. 2012-072881 filed in Japan, the content of which is hereby incorporated by reference.

TECHNICAL FIELD

The present invention relates to a technology of providing predetermined information to a user by causing vibration on a display screen.

BACKGROUND ART

Conventionally, technologies for providing predetermined information by using the sense of touch have been studied.

There has been known a haptic device that vibrates a vibrator mounted on a user's fingernail when the user traces an object with the finger pad.

Also, there has been known a vibrating touch panel provided with a vibration element that is formed of a piezo element and a lever and greatly vibrates. An acrylic plate is placed on a piezo actuator using a mechanical lever. The piezo actuator is displaced vertically upward by applied voltage to cause the acrylic plate to vibrate, thereby providing vibration to the finger sliding on the acrylic plate.

SUMMARY OF INVENTION

Technical Problem

In addition to the above-described technologies, there are needs for a technology of enabling a user to operate a machine or a device by providing sensation to the user.

The present invention has been achieved to meet the above needs, and an aim thereof is to provide a portable terminal device that enables a user to recognize an object that the user is touching through pseudo sensation and to operate the portable terminal device.

Solution to Problem

A portable terminal and methods are disclosed. A portable terminal device comprises: a touch panel that detects a position of a touch, if an operator touches a display unit displaying an image, and outputs the position of the touch; a vibrator; an edge detector that detects an edge in the image; and a controller that determines whether the position of the touch corresponds with a position of the detected edge, causes the vibrator to start vibrating, if the position of the touch corresponds with the position of the detected edge, and inhibits the vibrator from vibrating, if the position of the touch does not correspond with the position of the edge.

BRIEF DESCRIPTION OF DRAWINGS

FIG. 3 shows an exemplary data structure of an edge information table 120 stored in an edge storage 112 of the portable terminal device 100.

FIG. 4A shows a finger tracing an image 151 displayed on the touch panel 113. FIG. 4B shows a finger pad in an actual contact with the surface of the touch panel 113. FIG. 4C shows a pseudo surface 113d of the touch panel 113 recognized by the finger pad.

FIG. 9 is an external perspective view showing the portable terminal device 100a.

DESCRIPTION OF EMBODIMENTS

1. Embodiment 1

The following describes a portable terminal device 100 of an embodiment pertaining to the present invention.

The portable terminal device 100 is configured to transmit/receive a call or an e-mail to/from other portable terminal devices or portable telephones through unillustrated base stations and portable telephone networks.

Figure 1:
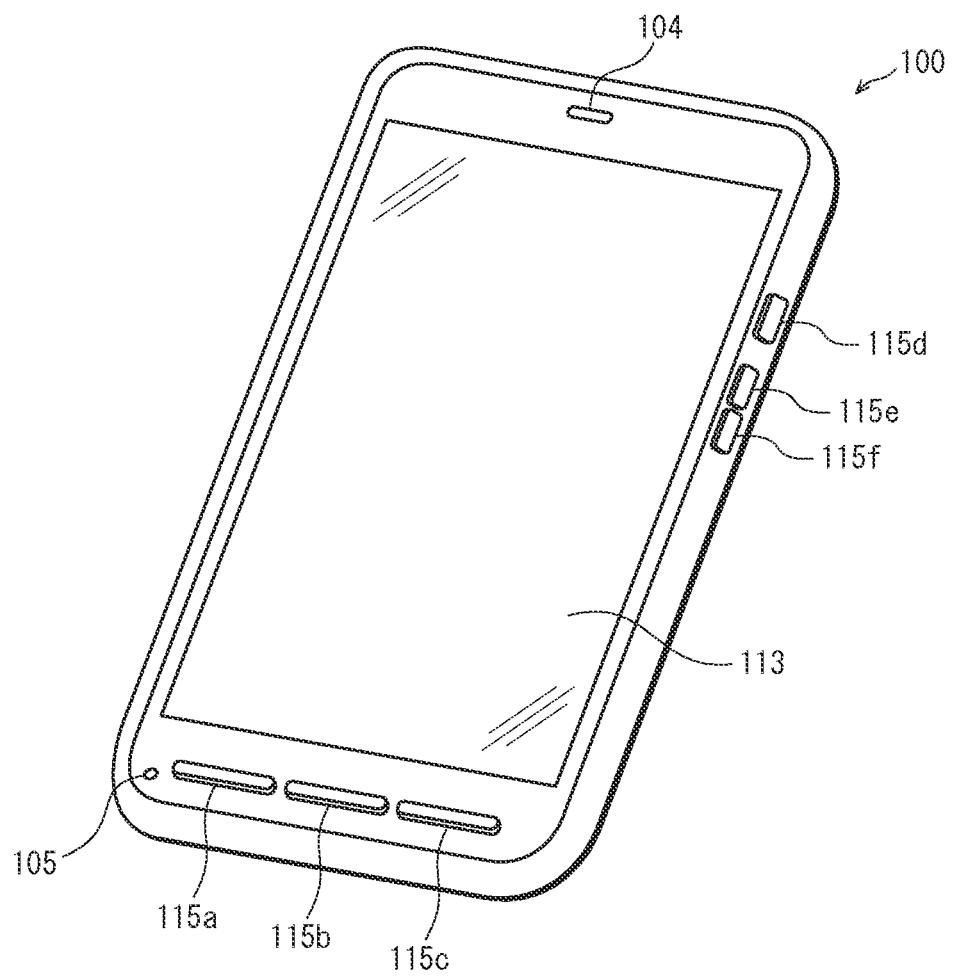
FIG. 1 is an external perspective view showing a portable terminal device 100 pertaining to Embodiment 1 of the present invention.

The portable terminal device 100 includes a touch panel 113 provided on the front surface and having an exposed display surface, as shown in FIG. 1. When operating the portable terminal device 100, the user usually touches the touch panel 113 with his/her finger for example, and slides the finger while touching on the touch panel 113.

1.1 Structure of Portable Terminal Device 100

Figure 2:
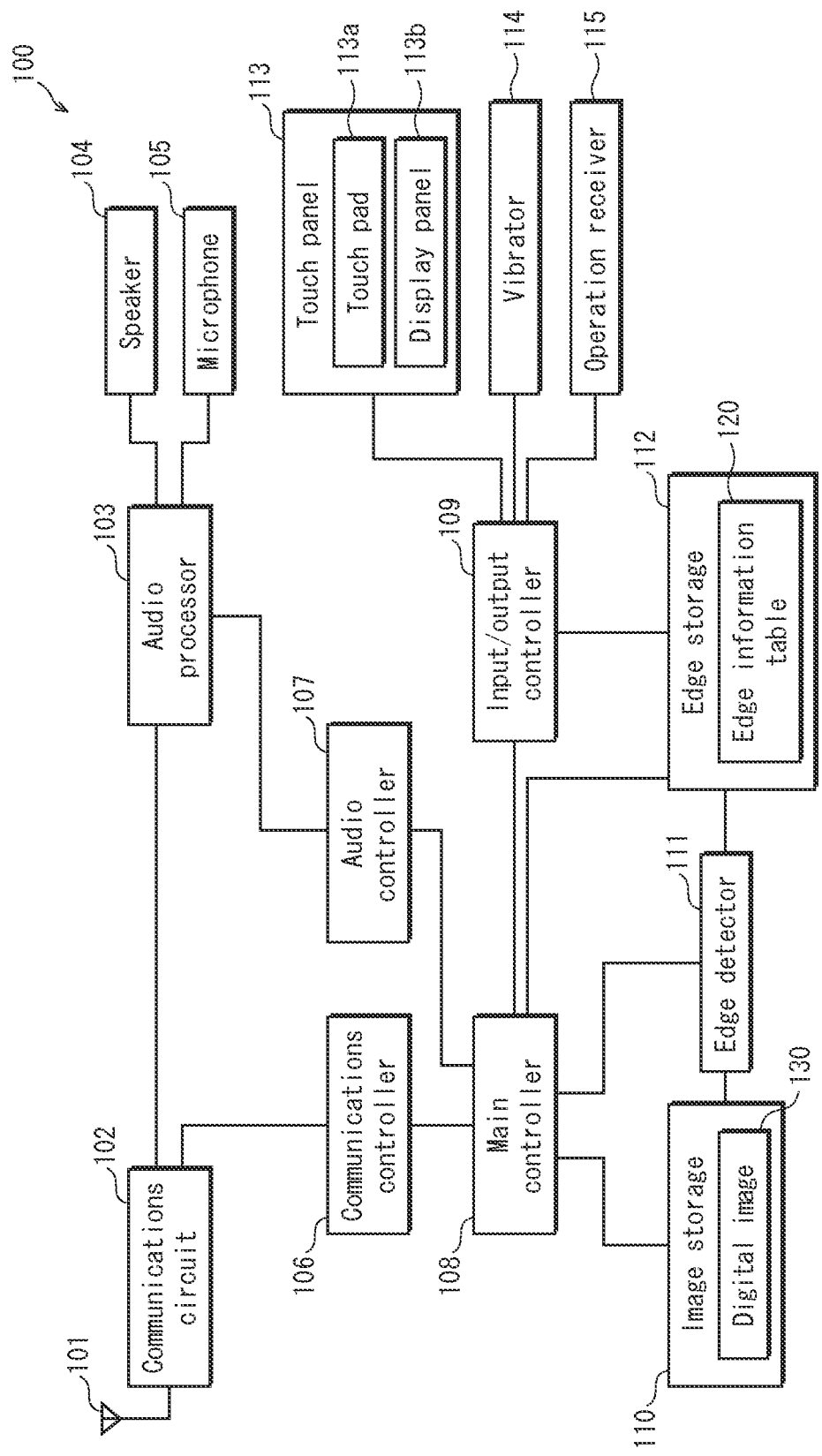
FIG. 2 is a block diagram showing the structure of the portable terminal device 100.

As shown in FIG. 2, the portable terminal device 100 includes an antenna 101, a communications circuit 102, an audio processor 103, a speaker 104, a microphone 105, a communications controller 106, an audio controller 107, a main controller 108, an input/output controller 109, an image storage 110, an edge detector 111, an edge storage 112, the touch panel 113, a vibrator 114 and an operation receiver 115.

(1) Touch Panel 113

The touch panel 113 includes a display panel 113b such as a liquid crystal display, and a touch pad 113a attached to the display surface of the display panel 113b, for example.

When the finger touches a point on the touch pad 113a, the touch pad 113a detects a position of the point at predetermined time intervals, e.g., per 50 ms. Next, the touch pad 113a generates a position information piece indicating the position of the point (e.g., x and y coordinates). The touch pad 113a outputs the position information piece, via the input/output controller 109, to the main controller 108 as a signal. The user slides the finger on the touch pad 113a while keeping the finger in contact with the touch pad 113a. The touch pad 113a then continuously detects positions of points touched with the finger. Subsequently, the touch pad 113a continuously generates position information pieces indicating the positions of the points (e.g., x and y coordinates), and outputs the position information pieces, via the input/output controller 109, to the main controller 108 as signals.

The display panel 113b receives from the main controller 108 an image and data indicating the display position of the image, and displays the acquired image at the position indicated by the data.

An exemplary image is an image showing scenery. The scenery includes a mountain, a river, a tree, etc. The display panel 113b displays the acquired image of the scenery at the position indicated by the data.

(2) Image Storage 110 and Edge Storage 112

The image storage 110 and the edge storage 112 are each composed of a non-volatile semiconductor memory.

The image storage 110 stores therein a digital image 130 currently displayed on the display panel 113b of the touch panel 113. The digital image 130 includes one or more objects. An exemplary digital image 130 is an image of scenery as above. When the digital image 130 shows the scenery, the digital image 130 includes a mountain, a river, a tree, etc., as objects.

Further, the edge storage 112 includes an edge information table 120 for storing edge information pieces generated by the edge detector 111 described later.

FIG. 3 shows the exemplary data structure of the edge information table 120.

As shown in FIG. 3 as an example, the edge information table 120 includes a plurality of edge information pieces in one-to-one correspondence with the objects. Each edge information piece is composed of a start position (x and y coordinates) and an end position (x and y coordinates). One edge detected by the edge detector 111 from an image is divided into a plurality of line segments. Each edge information piece indicates the position of a line segment.

Here, one edge is detected as a straight line, a broken line, a curved line, etc.

For example, a start position 121 (represented by the coordinates (100, 110)) indicates that one line segment constituting one edge has the start position with an x-coordinate of 100 and a y-coordinate of 110. Also, an end position 122 (represented by the coordinates (200, 210)) indicates that the line segment has the end position with an x-coordinate of 200 and a y-coordinate of 210.

In the above description, the detected one edge is divided in a plurality of line segments, the line segments correspond one-to-one with the edge information pieces, and each edge information piece indicates the position of a corresponding one of the line segments. Alternatively, the one detected edge may be divided into a plurality of line segments, and one edge information piece may correspond with one edge. In this case, the one edge information piece indicates the positions of the plurality of line segments constituting the one edge. In this case, each edge information piece is composed of a start position (x and y coordinates), at least one middle positions (x and y coordinates), and an end position (x and y coordinates).

(3) Operation Receiver 115

The operation receiver 115 includes buttons 115a, 115b, 115c, 115d, 115e and 115f.

As shown in FIG. 1, the buttons 115a, 115b and 115c are positioned on the front surface of the portable terminal device 100, and the buttons 115d, 115e and 115f are positioned on the side surface of the portable terminal device 100. The user operates the portable terminal device 100 by pressing each of the buttons 115a, 115b, 115c, 115d, 115e and 115f.

The button 115a is used to display an options menu. The button 115b is used to display a desktop screen. The button 115c is used to return to the immediately prior screen. The button 115d is a power button used to switch on or off the portable terminal device 100.

The button 115e is used to start pseudo sensation provision (pseudo sensation provision start button). The button 115f is used to end pseudo sensation provision (pseudo sensation provision end button).

When the user presses each of these buttons, the operation receiver 115 outputs a signal indicating that the button is pressed to the main controller 108 through the input/output controller 109.

(4) Edge Detector 111

The edge detector 111 reads the digital image 130 from the image storage 110, under the control of the main controller 108. Subsequently, the edge detector 111 detects, from the digital image 130, an edge of each of objects included in the digital image 130 by employing an edge detection method such as the Canny edge detection.

As described above, one detected edge includes a straight line, a broken line, a curved line, etc.

Here, an edge of each object is the peripheral outline that distinguishes the object from other objects, or distinguishes the object from the background. In other words, the edge of the object is the border between the object and its exterior.

Subsequently, the edge detector 111 divides the detected edge into a plurality of line segments, and generates edge information pieces in one-to-one correspondence with positions of the line segments constituting the edge.

Each edge information piece is, as described above, composed of x and y coordinates of start and end positions of a line segment constituting the edge.

Subsequently, the edge detector 111 associates the edge information piece with an object, and writes the edge information piece in the edge information table 120 included in the edge storage 112. When a plurality of edge information pieces are generated from the digital image 130, the edge detector 111 writes the plurality of edge information pieces in the edge information table 120.

(5) Input/Output Controller 109

The input/output controller 109 relays transmission/reception of information between the touch panel 113, the vibrator 114 or the operation receiver 115, and the main controller 108.

(6) Main Controller 108

The main controller 108 receives a signal from the touch pad 113a of the touch panel 113 or the operation receiver 115 through the input/output controller 109, as described below.

When the finger is in contact with the touch pad 113a, the main controller 108 receives, as a signal, a position information piece indicating a position of a point touched with the finger (x and y coordinates) from the touch panel 113 through the input/output controller 109 at predetermined time intervals, e.g., per 50 ms.

The main controller 108 also receives a signal from the operation receiver 115 through the input/output controller 109. The signal received from the operation receiver 115 indicates that the pseudo sensation provision start button is pressed or indicates that the pseudo sensation provision end button is pressed, for example.

Upon receiving the signal indicating that the pseudo sensation provision start button is pressed, the main controller 108 sets a sensation provision mode to "ON". Further, upon receiving the signal indicating that the pseudo sensation provision start button is pressed, the main controller 108 instructs the edge detector 111 to read the digital image 130 from the image storage 110, detect an edge of an object included in the read digital image 130, and generate an edge information piece. Upon receiving the signal indicating that the pseudo sensation provision end button is pressed, the main controller 108 sets the sensation provision mode to "OFF".

When the received signal is a position information piece (x and y coordinates), the main controller 108 determines whether the sensation provision mode is "OFF" or "ON".

When the sensation provision mode is "OFF", the main controller 108 performs processing that corresponds with the received position information piece and is different from processing that is performed when the sensation provision mode is "ON". Here, examples of such processing include activation of a camera function, establishment of the Internet connection, and reception of FM broadcast. Processing such as activation of a camera function, establishment of the Internet connection, and reception of FM broadcast is determined according to a position information piece.

Upon receiving the position information piece from the touch panel 113 when the sensation provision mode is "ON", the main controller 108 reads the edge information table 120 from the edge storage 112. Subsequently, the main controller 108 determines whether the received position information piece is associated with any one of the edge information pieces read from the edge information table 120. To be specific, the main controller 108 compares the received position information piece with the edge information pieces read from the edge information table 120. Subsequently, the main controller 108 determines whether the position indicated by the position information piece is located within the line segment indicated by any one of the edge information pieces included in the edge information table 120.

Here, instead of determining whether the position indicated by the received position information piece is located within the line segment indicated by the edge information piece, the main controller 108 may determine whether a certain area based on the position intersects with the line segment, as described below.

For example, supposing a circle centering on the position indicated by the received position information piece with the radius of 10 dots, the main controller 108 may determine whether such a circle intersects with the line segment indicated by any one of the edge information pieces. Note that the radius of the circle is not limited to 10 dots, and may be 5 dots, 15 dots, 20 dots, etc. In addition, another shape other than a circle may be used. It is possible to suppose a polygon centering on the position indicated by the received position information piece. The distance from the center to vertex of the polygon may be 10 dots, for example. The polygon may be a hexagon, a dodecagon, a hexadecagon, etc.

Further, instead of the line segment indicated by the edge information piece, a certain rectangular region based on the line segment may be used. To be specific, the rectangular region may be formed by extending the line segment towards both sides thereof each by 5 dots. In this case, the main controller 108 determines whether the position indicated by the received position information piece is located within the rectangular region. Here, the width to be extended is not limited to 5 dots, and may be 3 dots, 7 dots, 10 dots, etc.

The main controller 108 determines whether the position of the touched point is associated with the position of the edge that has been detected, as described below. To be specific, the main controller 108 may determine whether the above circle is located within the above rectangular region. Alternatively, the main controller 108 may determine whether the above circle overlaps the above rectangular region. When the circle and the rectangular region correspond with each other, the main controller causes the vibrator to start vibrating. In contrast, when the circle and the rectangular region do not correspond with each other, the main controller inhibits the vibrator from vibrating.

When the position indicated by the received position information piece is located within the line segment indicated by any one of the edge information pieces included in the edge information table 120, the main controller 108 instructs the vibrator 114, through the input/output controller 109, to vibrate for 50 ms. That is, the main controller 108 instructs the vibrator 114 to start vibrating, and when 50 ms has elapsed since the start of the vibration, the main controller 108 instructs the vibrator 114 to stop vibrating. Note that the time period for which the vibrator 114 vibrates is not limited to 50 ms, and may be 75 ms, 100 ms, etc.

When the above circle is determined to intersect with the line segment indicated by any of the edge information pieces, the main controller 108 may instruct the vibrator 114 to vibrate for 50 ms. Further, when the position indicated by the received position information piece is determined to be located within the above rectangular region, the main controller 108 may instruct the vibrator 114 to vibrate for 50 ms. Furthermore, when the above circle is determined to be located within the above rectangular region, the main controller 108 may instruct the vibrator 114 to vibrate for 50 ms.

The main controller performs other controls.

(7) Vibrator 114

The vibrator 114 is formed by attaching a weight having an unbalanced center of gravity to the axis of a motor. The vibrator 114 is provided to the back surface of the touch panel 113 so as to be in contact therewith. The vibrator 114 starts and stops vibrating under the control of the main controller 108 through the input/output controller 109.

(8) Antenna 101, Communications Circuit 102 and Communications Controller 106

The antenna 101 transmits/receives wireless signals to/from unillustrated base stations through wireless networks. The communications circuit 102 selects a frequency of, or converts a frequency of a wireless signal transmitted/received by the antenna 101. The communications controller 106 relays transmission/reception of information between the communications circuit 102 and the main controller 108.

(9) Audio Processor 103, Speaker 104, Microphone 105 and Audio Controller 107

The audio processor 103 demodulates an audio signal received by the communications circuit 102 into a sound signal, and outputs the sound signal to the speaker 104. The audio processor 103 also modulates a sound signal input from the microphone 105 into an audio signal, which is an electric signal, and instructs the communications circuit 102 to transmit the audio signal. The speaker 104 outputs a sound such as a voice. The microphone 105 acquires a sound such as a voice. The audio controller 107 controls audio processing performed by the audio processor 103.

1.2 Explanation of Pseudo Sensation on Touch Panel 113 of Portable Terminal Device 100

Figure 4A:
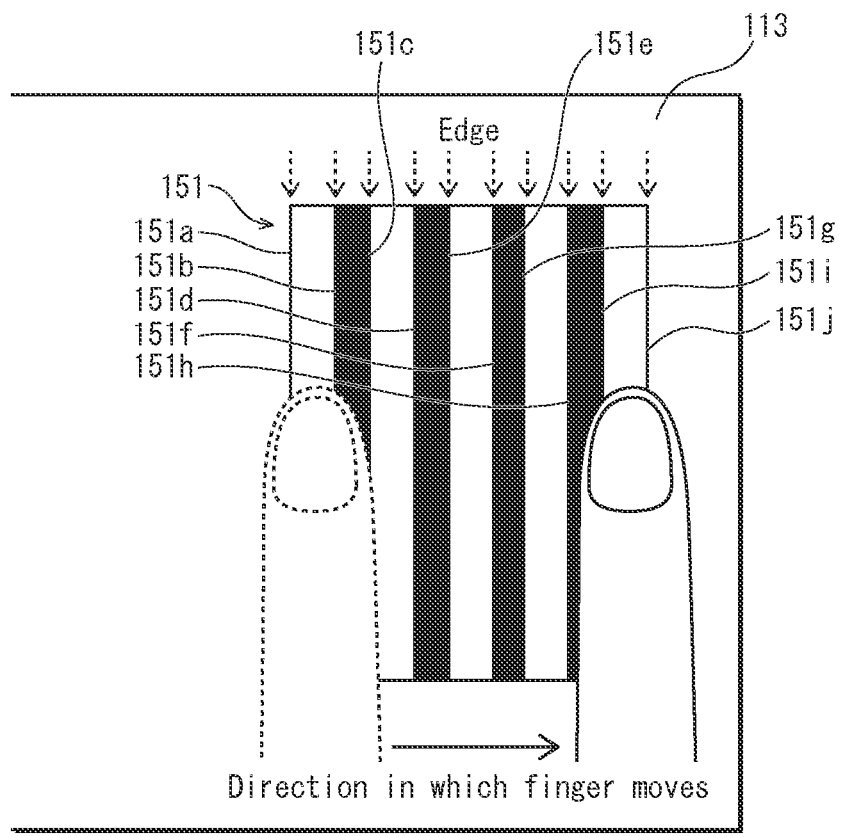
FIGS. 4A-4C are conceptual diagrams for explaining pseudo sensation on a touch panel 113 of the portable terminal device 100.
Figure 4B:
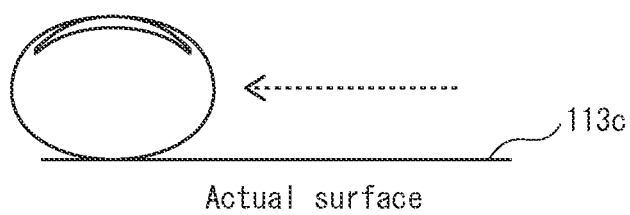
Figure 4C:
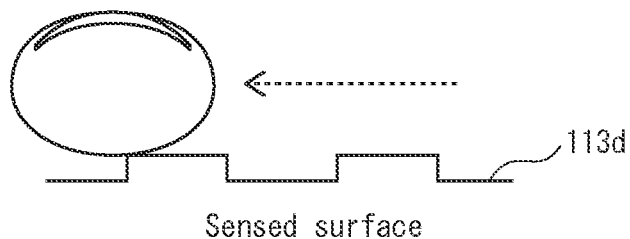

The following explains pseudo sensation on the touch panel 113 of the portable terminal device 100 with reference to FIG. 4A, FIG. 4B and FIG. 4C. As shown in FIG. 4A, it is presumed that the touch panel 113 shows an image 151, for example. The image 151 includes an object with a stripe pattern, as shown in FIG. 4A. As the user slides the finger pad on the touch panel 113, the vibrator 114 vibrates each time the finger pad comes to contact with edges 151*a*, 151*b*, . . . , 151*j* of the object.

As shown in FIG. 4B, the actual surface 113*c* of the touch panel 113 is flat.

When tracing the surface 113*c* of the touch panel 113 with the finger pad, the user recognizes that the surface is flat through the sense of touch at the finger pad.

However, the vibrator 114 vibrates each time the finger pad comes to contact with edges 151*a*, 151*b*, . . . , 151*j* of the object. Thus, it is possible to cause the user to experience as if the surface 113*d* of the touch panel 113 were uneven, as shown in FIG. 4C.

1.3 Operations of Portable Terminal Device 100

Figure 5:
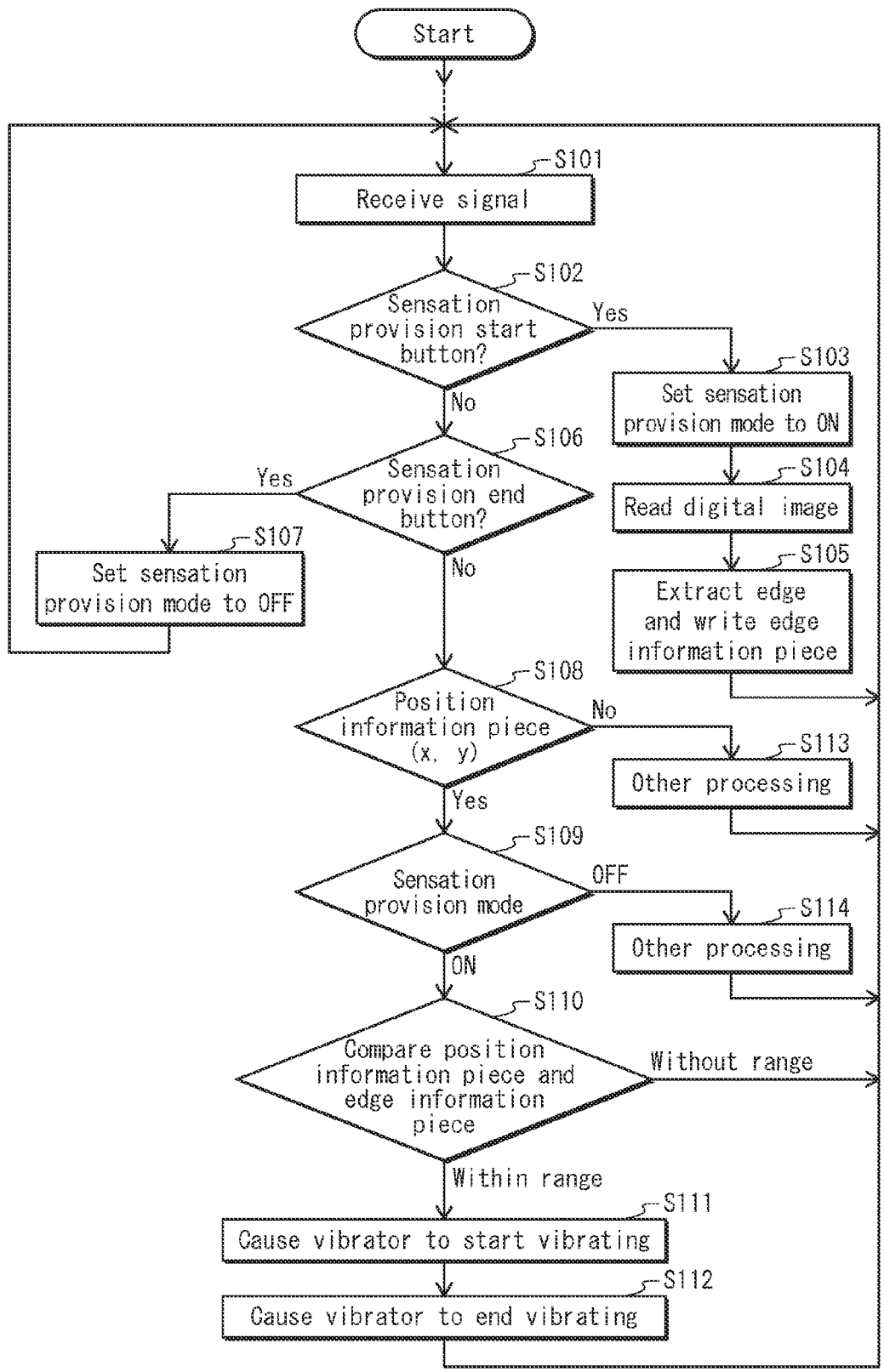
FIG. 5 is a flowchart showing operations of the portable terminal device 100.

The following describes the operations of the portable terminal device 100 with reference to the flowchart in FIG. 5. The following explanation focuses on the operations of the main controller 108.

The main controller 108 receives a signal from the touch pad 113a of the touch panel 113 or the operation receiver 115 through the input/output controller 109 (step S101).

When the signal indicates that the pseudo sensation provision start button is pressed ("Yes" in step S102), the main controller 108 sets the sensation provision mode to "ON" (step S103). Subsequently, the edge detector 111 reads the digital image 130 from the image storage 110 (step S104). The edge detector 111 detects an edge of an object from the digital image 130, generates an edge information piece, and writes the edge information piece in the edge information table 120 (step S105). Subsequently, processing proceeds to step S101.

When the signal indicates that the pseudo sensation provision end button is pressed ("Yes" in step S106), the main controller 108 sets the sensation provision mode to "OFF" (step S107). Subsequently, processing proceeds to step S101.

When the signal is not a position information piece (x and y coordinates) ("No" in step S108), the main controller 108 performs processing that corresponds with the signal and is different from processing performed when the signal is a position information piece (step S113). Subsequently, processing proceeds to step S101.

When the signal is a position information piece (x and y coordinates) ("Yes" in step S108), the main controller 108 determines whether the sensation provision mode is "OFF" or "ON" (step S109).

When the sensation provision mode is "OFF" ("OFF" in step S109), the main controller 108 performs processing that corresponds with the position information piece (x and y coordinates) and is different from processing performed when the sensation provision mode is "ON" (step S114). Subsequently, processing proceeds to step S101.

When the sensation provision mode is "ON" ("ON" in step S109), the main controller 108 compares the received position information piece and the edge information pieces included in the edge information table 120. The main controller 108 determines whether the position indicated by the position information piece is located within the line segment indicated by any one of the edge information pieces included in the edge information table 120 (step S110).

When the position indicated by received the position information piece is not located within the line segment indicated by any one of the edge information pieces included in the edge information table 120 ("without range" in step S110), processing proceeds to step S101.

When the position indicated by the received position information piece is located within the line segment indicated by any one of the edge information pieces included in the edge information table 120 ("within range" in step S110), the main controller 108 instructs the vibrator 114, through the input/output controller 109, to start vibrating. The vibrator 114 starts vibrating (step S111). When 50 ms has passed since the vibration started, the main controller 108 instructs the vibrator 114, through the input/output controller 109, to stop vibrating. The vibrator 114 stops vibrating (step S112). Subsequently, processing proceeds to step S101.

1.4 Conclusion

As described above, according to Embodiment 1, the vibrator 114 vibrates when the position of the touched point on the touch panel 113 corresponds with the position of the edge detected in the image displayed on the touch panel. The vibration produced by the vibrator 114 enables the user to recognize the edge and physically sense the shape of the image.

As a result, the portable terminal device pertaining to Embodiment 1 enables the user to recognize the shape of the image even when the user cannot see an image displayed on the touch panel. For example, even when a visually impaired user uses a portable terminal device, even when a user operates a portable terminal device put in a pocket, and even when a user operates a portable terminal device that is out of sight in a crowded train, the user can recognize the shape. Thus, the present invention has the advantageous effect that the user is able to operate the portable terminal device based on the shape of the image that the user has recognized.

2. Embodiment 2

The following describes a portable terminal device 100a of another embodiment pertaining to the present invention.

2.1 Structure of Portable Terminal Device 100a

The portable terminal device 100a has the same structure as the portable terminal device 100 in Embodiment 1. The following explanation focuses on the differences from the portable terminal device 100.

(1) Buttons 115g, 115h and 115i

Figure 9:
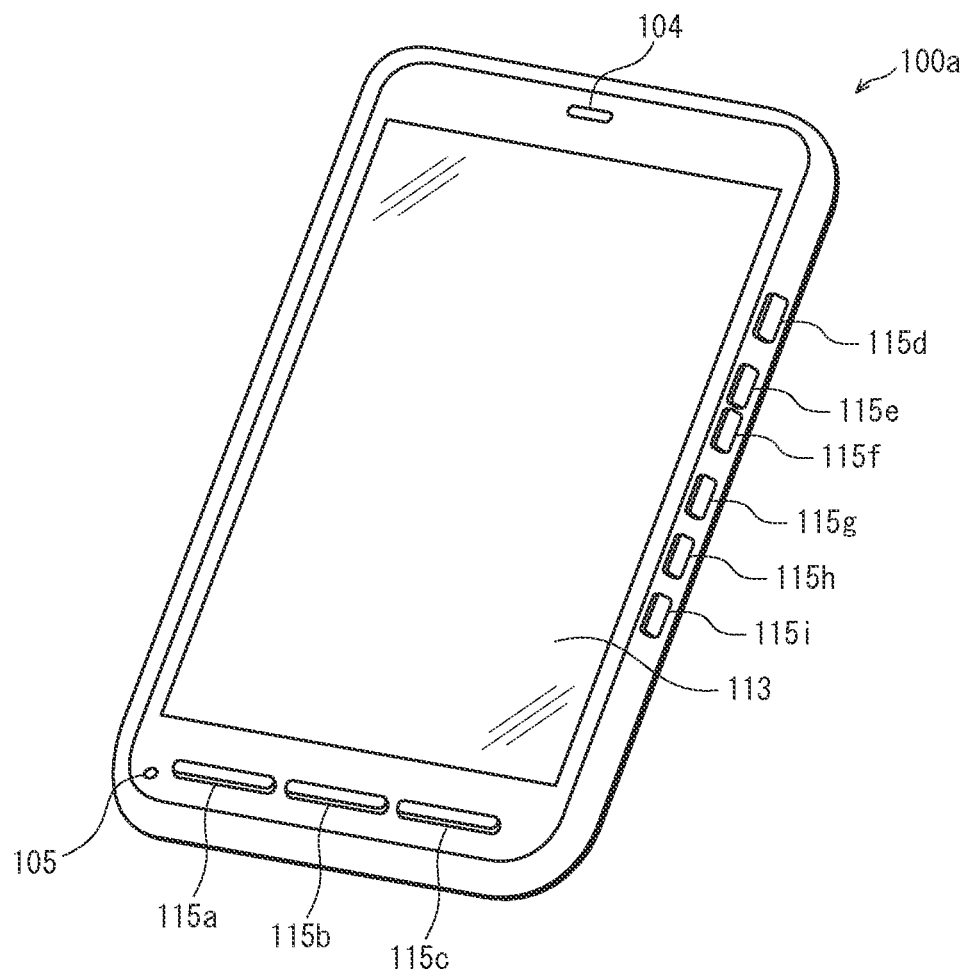

The portable terminal device 100a further includes buttons 115g, 115h and 115i on a side surface thereof, as shown in FIG. 9.

The button 115g is for instructing execution of functions (execute button).

The button 115h is for instructing start of a sensation shortcut (sensation shortcut start button). The button 115i is for instructing end of a sensation shortcut (sensation shortcut end button). Sensation shortcut will be described later.

Note that the portable terminal device 100a may include the buttons 115g, 115h and 115i on the front surface thereof.

(2) Image Storage 110

The image storage 110 further stores therein beforehand digital images 210, 220 and 230 that are to be displayed on the display panel 113b of the touch panel 113. One of these digital images 210, 220 and 230 is displayed on the display panel 113b of the touch panel 113 by an instruction of the user.

(a) Digital Image 210

Figure 6:
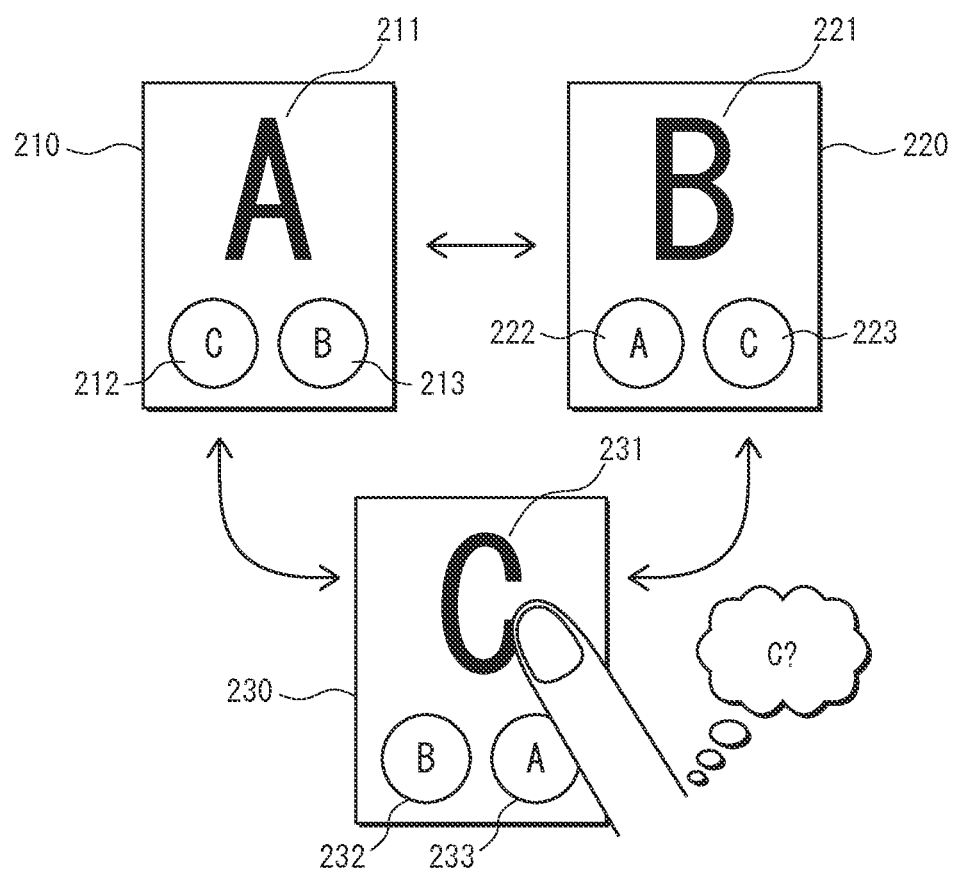
FIG. 6 shows switching of operation screens of a portable terminal device 100a pertaining to Embodiment 2 of the present invention.

The digital image 210 includes objects 211, 212 and 213 as shown in FIG. 6, for example. The object 211 is a function object corresponding with a function. When this object is displayed, it indicates that a user instruction is awaited in order to cause the portable terminal 100a device to perform the function. Each of the objects 212 and 213 is a button object. Each of these objects is assigned one function of the portable terminal device 100a.

The object 211 represents a character "A" as shown in FIG. 6. The object 211 indicates that a user instruction is awaited in order to cause the portable terminal device 100a to perform a function of receiving an e-mail, for example. When the object 211 is displayed on the screen and the user presses the button 115g, which is the execution button, the function of receiving an e-mail is performed. Such an operation is referred to as sensation shortcut.

The object 212 represents a character "C", as shown in FIG. 6. The object 212 indicates that when a touch operation is performed on the object 212, a function of displaying a digital image 230 is performed, and the screen switches to a screen corresponding with the digital image 230.

The object 213 represents a character "B", as shown in FIG. 6. The object 213 indicates that when a touch operation is performed on the object 213, a function of displaying a digital image 220 is performed, and the screen switches to a screen corresponding with the digital image 220.

(b) Digital Image 220

The digital image 220 includes objects 221, 222 and 223 as shown in FIG. 6, for example. The object 221 is a function object corresponding with another function. When this object is displayed, it indicates that a user instruction is awaited in order to cause the portable terminal 100a device to perform the function. Each of the objects 222 and 223 is a button object. Each of these objects is assigned one function of the portable terminal device 100a.

The object 221 represents a character "B" as shown in FIG. 6. The object 221 indicates that a user instruction is awaited in order to cause the portable terminal device 100a to perform a function of playing back music, for example. When the object 221 is displayed on the screen and the user presses the button 115g, which is the execution button, the function of playing back music is performed.

The object 222 represents a character "A", as shown in FIG. 6. The object 222 indicates that when a touch operation is performed on the object 222, a function of displaying a digital image 210 is performed, and the screen switches to a screen corresponding with the digital image 210.

The object 223 represents a character "C", as shown in FIG. 6. The object 223 indicates that when a touch operation is performed on the object 223, a function of displaying a digital image 230 is performed, and the screen switches to a screen corresponding with the digital image 230.

(b) Digital Image 230

The digital image 230 includes objects 231, 232 and 233 as shown in FIG. 6, for example. The object 231 is a function object corresponding with yet another function. When this object is displayed, it indicates that a user instruction is awaited in order to cause the portable terminal 100a device to perform the function. Each of the objects 232 and 233 is a button object. Each of these objects is assigned one function of the portable terminal device 100a.

The object 231 represents a character "C" as shown in FIG. 6. The object 231 indicates that a user instruction is awaited in order to cause the portable terminal device 100a to perform a function of playing back a video, for example. When the object 231 is displayed on the screen and the user presses the button 115g, which is the execution button, the function of playing back a video is performed.

Here, the object 231 included in the digital image 230 is different from the object 211 included in the digital image 210 in shape. Also, the object 231 is different from the object 221 included in the digital image 220 in shape. As a result, edges detected from the objects 211, 221 and 231 are different from one another in shape. Accordingly, by controlling vibration with use of edges that form different shapes, the user is able to recognize that each object has a different shape.

The object 232 represents a character "B", as shown in FIG. 6. The object 232 indicates that when a touch operation is performed on the object 232, a function of displaying a digital image 220 is performed, and the screen switches to a screen corresponding with the digital image 220.

The object 233 represents a character "A", as shown in FIG. 6. The object 233 indicates that when a touch operation is performed on the object 233, a function of displaying a digital image 210 is performed, and the screen switches to a screen corresponding with the digital image 210.

(4) Main Controller 108

The main controller 108 receives a signal from the touch pad 113a of the touch panel 113 or the operation receiver 115 through the input/output controller 109, as described below.

The main controller 108 receives, from the touch panel 113, the position information piece (x and y coordinates) through input/output controller 109. Further, the main controller 108 receives a signal from the operation receiver 115 through the input/output controller 109. The signal indicates that the sensation shortcut start button is pressed or indicates that the sensation shortcut end button is pressed, for example.

Upon receiving the signal indicating that the sensation shortcut start button is pressed, the main controller 108 sets a sensation shortcut mode to "ON". Further, upon receiving the signal indicating that the sensation shortcut start button is pressed, the main controller 108 instructs the edge detector 111 to read a digital image from the image storage 110, detect an edge of an object included in the read digital image, and generate an edge information piece, as described above. Upon receiving the signal indicating that the sensation shortcut end button is pressed, the main controller 108 sets a sensation shortcut mode to "OFF".

Subsequently, the main controller 108 determines whether the sensation shortcut mode is "OFF" or "ON".

When the sensation shortcut mode is "OFF", the main controller 108 performs processing corresponding with the received signal. Here, an example of the processing corresponding with the signal includes execution of a function of the portable terminal device 100a corresponding with the function object within the displayed digital image. In this case, the received signal is the position information piece indicating a position at which the function object is displayed. Further, examples of the processing corresponding with the signal include activation of a camera function, establishment of the Internet connection, and reception of FM broadcast. Processing such as activation of a camera function, establishment of the Internet connection, and reception of FM broadcast are determined in one-to-one correspondence with signals.

When the sensation shortcut mode is "ON" and the received signal indicates that the execution button is pressed, the main controller 108 causes the portable terminal device 100a to perform a function corresponding with the function object within the displayed digital image. For example, when the digital image 210 is displayed, the main controller 108 causes the portable terminal device 100a to perform the function of receiving an e-mail. When the digital image 220 is displayed, the main controller 108 causes the portable terminal device 100a to perform the function of playing back music. When the digital image 230 is displayed, the main controller 108 causes the portable terminal device 100a to perform the function of playing back a video.

When the sensation shortcut mode is "ON" and the received signal indicates that another button different from the execution button is pressed, the main controller 108 causes the portable terminal device 100a to perform a function corresponding with the different button.

When the sensation shortcut mode is "ON" and the received signal is a position information piece (x and y coordinates), the main controller 108 reads the edge information table 120 from the edge storage 112, as described above. Subsequently, the main controller 108 compares the position information piece with the edge information pieces read from the edge information table 120. Subsequently, the main controller 108 determines whether the position indicated by the received position information piece is located within the line segment indicated by any one of the edge information pieces included in the edge information table 120.

When the position indicated by the position information piece is not located within the line segment indicated by any one of the edge information pieces included in the edge information table 120, the main controller 108 does nothing.

The main controller 108 stores therein information indicating each area in which a function object or a button object is displayed.

When the position indicated by the received position information piece is located within the line segment indicated by any one of the edge information pieces included in the edge information table 120, the main controller 108 determines whether the edge information piece corresponds with the function object or the button object. In other words, the main controller 108 determines whether the position indicated by the received position information piece matches the area of the function object or the area of the button object. Instead of determining whether the position indicated by the position information piece matches an area of an object based on line segments, the main controller 108 may determine whether a certain area based on the position overlaps an area of any object. For example, supposing a circle centering on the position indicated by the received position information piece with the radius of 10 dots, the main controller 108 may determine whether such a circle overlaps an area of any object. The radius of the circle may be 5 dots, 15 dots, 20 dots, etc. Further, supposing a polygon centering on the position indicated by the received position information piece, the main controller 108 may determine whether such a polygon overlaps an area of any object.

When the main controller 108 determines that the edge information piece corresponds with a function object, the main controller 108 instructs the vibrator 114, through the input/output controller 109, to vibrate for 50 ms, as described above.

When the main controller 108 determines that the edge information piece corresponds with a button object, the main controller 108 causes the portable terminal device 100a to perform the function of displaying a digital image corresponding with the button object, and switches the screen to a screen corresponding with the digital image.

For example, when the button object is the object 212 shown in FIG. 6 and the object 212 is operated, the main controller 108 causes the portable terminal device 100a to perform the function of displaying the digital image 230 and switches the screen to a screen corresponding with the digital image 230.

2.2 Operations of Portable Terminal Device 100a

Figure 7:
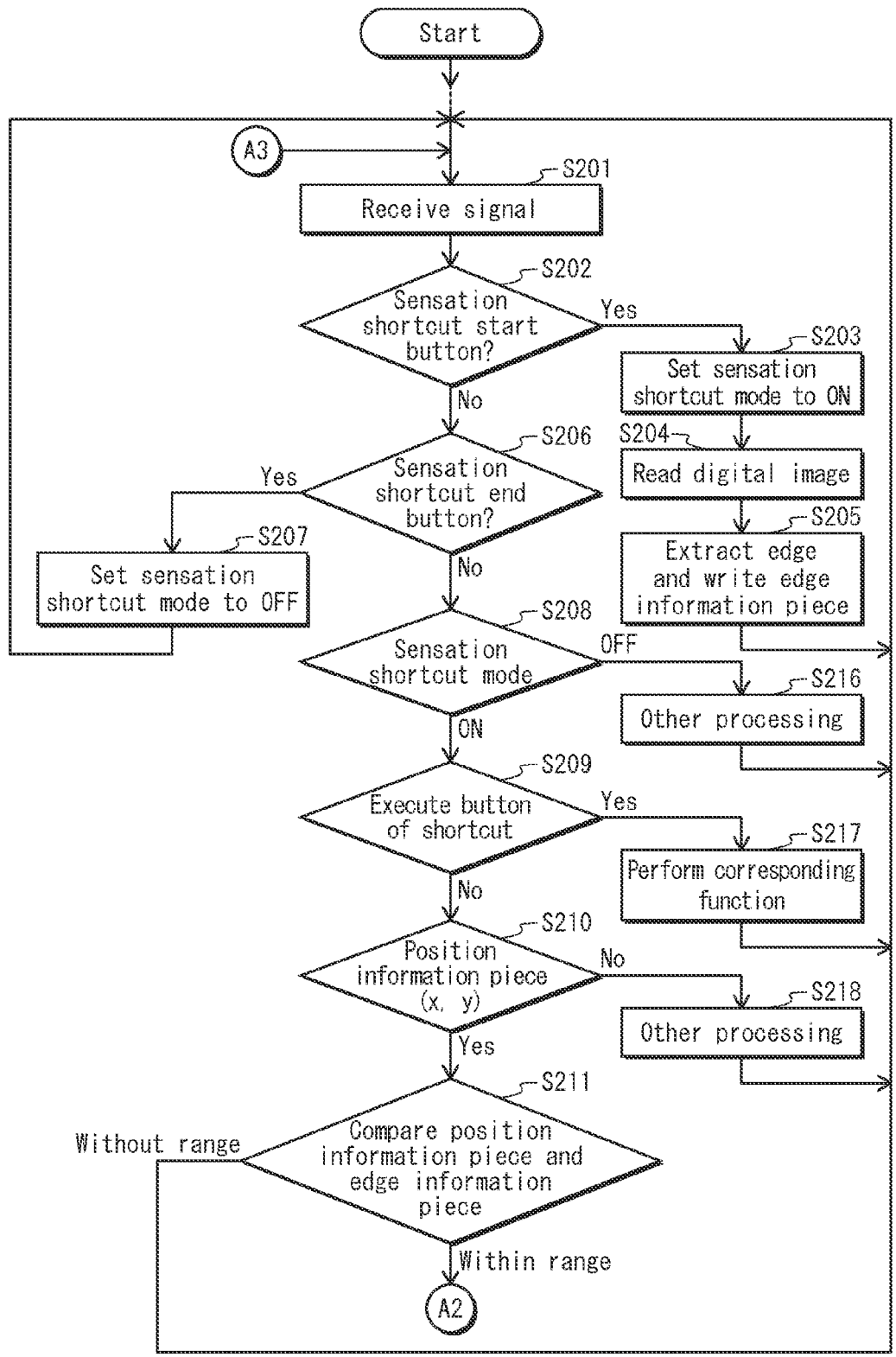
FIG. 7 is a flowchart showing operations of the portable terminal device 100a, continuing to FIG. 8.
Figure 8:
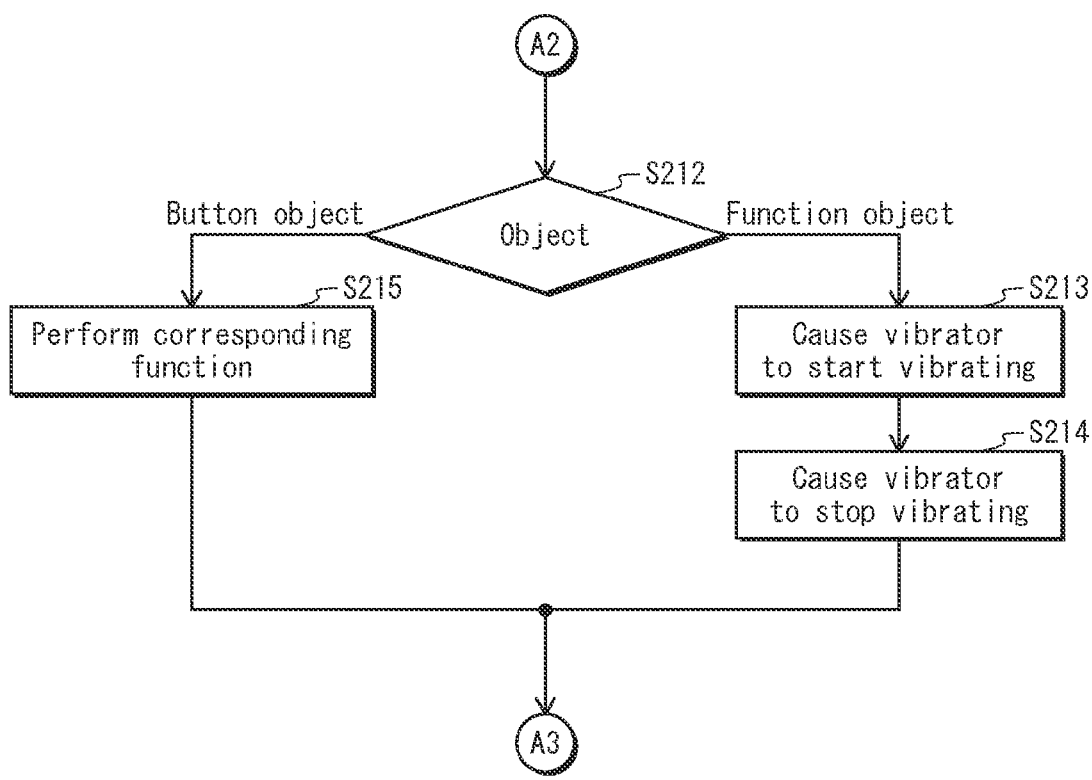
FIG. 8 is a flowchart showing operations of the portable terminal device 100a, continuing from FIG. 7.

The following describes the operations of the portable terminal device 100a with reference to the flowchart in FIG. 7.

The following explanation focuses on the operations of the main controller 108.

The main controller 108 receives a signal from the touch pad 113a of the touch panel 113 or the operation receiver 115 through the input/output controller 109 (step S201).

When the signal indicates that the sensation shortcut start button is pressed ("Yes" in step S202), the main controller 108 sets the sensation shortcut mode to "ON" (step S203). The edge detector 111 reads, from the image storage 110, a digital image that is currently displayed (step S204). The edge detector 111 detects an edge of an object from the digital image, generates an edge information piece, and writes the edge information piece in the edge information table 120 (step S205). Subsequently, processing proceeds to step S201.

Alternatively, when the signal does not indicate that the sensation shortcut start button is pressed ("No" in step S202) and the main controller 108 receives a signal indicating that the sensation shortcut end button is pressed ("Yes" in step S206), the main controller 108 sets the sensation shortcut mode to "OFF" (step S207). Subsequently, processing proceeds to step S201.

In the case when the main controller 108 has not received a signal indicating that the sensation shortcut end button is pressed ("No" in step S206), the main controller 108 determines whether the sensation shortcut mode is "OFF" or "ON" (step S208). When the sensation shortcut mode is "OFF" ("OFF" in step S208), the main controller 108 performs processing that is different from processing that is performed when the sensation shortcut mode is "ON" (step S216). Subsequently, processing proceeds to step S201.

When the sensation shortcut mode is "ON" ("ON" in step S208) and the received signal indicates that the execution button is pressed ("Yes" in step S209), the main controller 108 causes the portable terminal device 100a to perform a corresponding function (step S217). Subsequently, processing proceeds to step S201.

When the received signal does not indicate that the execution button is pressed ("No" in step S209) and the received signal is not the position information piece (x and y coordinates) ("No" in step S210), the main controller 108 performs processing that corresponds with the received signal and is different from processing performed when the received signal indicates that the execution button is pressed or the received signal is the position information piece (step S218). Subsequently, processing proceeds to step S201.

When the received signal is the position information piece (x and y coordinates) ("Yes" in step S210), the main controller 108 compares the received position information piece and the edge information pieces included in the edge information table 120. Subsequently, the main controller 108 determines whether the position indicated by the position information piece is located within the line segment indicated by any one of the edge information pieces included in the edge information table 120 (step S211).

When the position indicated by the received position information piece is not located within the line segment indicated by any one of the edge information pieces included in the edge information table 120 ("without range" in step S211), processing proceeds to step S201.

When the position indicated by the received position information piece is located within the line segment indicated by any one of the edge information pieces included in the edge information table 120 ("within range" in step S211), the main controller 108 determines whether an object located at the position indicated by the position information piece is a function object or a button object (step S212). When the object is the function object ("function object" in step S212), the main controller 108 instructs the vibrator 114, through the input/output controller 109, to start vibrating. The vibrator 114 starts vibrating (step S213). When 50 ms has passed since the vibration started, the main controller 108 instructs the vibrator 114 to stop vibrating. The vibrator 114 stops vibrating (step S214). Subsequently, processing proceeds to step S201.

When the object is the button object ("button object" in step S212), the main controller 108 causes the portable terminal device 100a to perform a function corresponding with the button object (step S215). Subsequently, processing proceeds to step S201.

2.3 Conclusion

As described above, according to Embodiment 2, the portable terminal device 100a includes the operation receiver 115 that receives a button-pressing operation of the button 115g (execution button) from the user. An image displayed on the display panel 113b includes a function object corresponding with a function of the portable terminal device 100a.

When the operation receiver 115 receives the button-pressing operation, the main controller 108 causes the portable terminal device 100a to perform the function corresponding with the function object.

With this structure, the user can recognize the shape of the function object through the sense of touch, and causes the portable terminal device 100a to perform the function corresponding with the function object by pressing the execution button. Therefore, the present invention has the advantageous effect that the user can cause the portable terminal device 100a to perform a predetermined function even if the user uses the portable terminal device when the user cannot see the image displayed on the touch panel.

Further, an image displayed on the display panel 113b includes another button object. Said another button object is assigned a function of displaying another image. When the position of the touch on the touch pad 113a matches a position of an edge detected from said another button object, the main controller 108 causes the display panel to display said another image.

With this structure, when the user can recognize the shape of the function object through the sense of touch but the function is not a desired function, a touch operation made on a button object switches the screen to another screen corresponding with the button object. Therefore, the present invention has the advantageous effect that the user can switch the screen to another screen even if the user uses the portable terminal device when the user cannot see the image displayed on the touch panel.

3. Other Modifications

While the present invention has been described based on the above Embodiments, the present invention is of course not limited to these Embodiments. The present invention also includes cases such as the following.

(1) In Embodiment 1, the display panel 113b displays the image of scenery, for example. However, the display panel 113b is not limited to display an image of scenery.

For example, the display panel 113b may display an image notifying that a new e-mail has been received, an image notifying that the set time is reached, and an image representing a function that is currently selected in the portable terminal device 100. These are images designed for representing these events and functions.

An exemplary image for notifying that an e-mail has been received is an image including a decorative character designed based on the English character "r", which is the first character of "receive". In this case, the object is a decorative character designed based on the English character "r".

Further, an exemplary image notifying that the set time is reached is an image including a decorative character designed based on the English character "a", which is the first character of "alarm". In this case, the object is a decorative character designed based on the English character "a".

Furthermore, an exemplary function that is currently selected in the portable terminal device 100 is a silent mode. An exemplary image representing the silent mode is an image including a decorative character designed based on the English character "s", which is the first character of "silent". In this case, the object is a decorative character designed based on the English character "s".

For example, the image storage 110 may store therein, as digital images 130, an image notifying that a new e-mail has been received, an image notifying that the set time is reached, and an image indicating a function that is currently selected in the portable terminal device 100.

(2) In Embodiment 1, the display panel 113b displays the image of scenery, for example. The scenery includes a mountain, a river, a tree, etc. In this case, the image includes, as objects, a mountain, a river, a tree, etc. Accordingly, the image includes one or more objects. However, the image is not limited to this.

For example, when a person appears in the scenery, the person has eyes, a mouth and ears. As described above, the person in the scenery is an object. Further, the eyes, the mouth and the ears may be objects. In this way, the object may include objects (each referred to a child object). Further, a child object may include a grandchild object. In this way, the objects may have the nesting structure.

(3) In Embodiment 1, one edge detected by the edge detector 111 from an image is divided into a plurality of line segments, and each edge information piece indicates the position of a line segment. However, the edge is not limited to this.

One edge may be divided into a plurality of curve pieces, and the edge information pieces may indicate the positions of curve pieces in one-to-one correspondence. Each edge information piece may include a position information piece indicating three positions on the corresponding curve piece.

(4) In Embodiment 2, each button object included in each digital image shown in FIG. 6 indicates that when each button is operated, a function of displaying another digital image is performed, and the screen switches to a screen corresponding with said another digital image. However, the button object is not limited to this.

Each button object included in each digital image shown in FIG. 6 may represent an execution button for executing a function corresponding with the function object included in the digital image.

In other words, the digital image includes a function object and a button object, and the function object corresponds with one function of the portable terminal device 100a. When the position of the touched point on the touch pad 113a matches the position of an edge detected in the button object, the main controller 108 may cause the portable terminal device 100a to perform the function corresponding with the function object.

(5) In Embodiment 1, when the received signal indicates that the pseudo sensation provision start button is pressed, the edge detector 111 reads the digital image 130 from the image storage 110, detects the edge of the object from the digital image 130, generates the edge information piece, and writes the edge information in the edge information table 120.

Further, in Embodiment 2, when the signal indicates that the sensation shortcut start button is pressed, the edge detector 111 reads, from the image storage 110, the digital image that is currently displayed, detects the edge of the object from the digital image, generates the edge information piece, and writes the edge information in the edge information table 120.

In this way, each time a digital image is read, an edge of an object is detected from the digital image. However, detection of edges is not limited to this.

The edge detector 111 may detect edges in a digital image that is to be displayed on the display panel 113b, generate edge information pieces, and writes the edge information pieces in the edge information table 120 beforehand.

(6) As shown in FIG. 6 as an example, the function objects represent the characters "A", "B" and "C". The function objects may represent simple symbols, characters and numbers as graphic shapes. For example, the function object may represent a symbol "-", a number "1", a character "x", etc.

By employing these simple symbols, characters and numbers, recognition of images becomes more efficient.

(7) In Embodiment 1, the buttons 115e and 115f are provided on the side surface of the portable terminal device 100. The button 115e is the pseudo sensation provision start button, and the button 115*f* is the pseudo sensation provision end button. However, these buttons are not limited to this.

A button 115*e* may be provided on the side surface of the portable terminal device 100 instead of the buttons 115*e* and 115*f*. The button 115*e* is used to start and end pseudo sensation provision.

When the button 115*e* is pressed after the portable terminal device 100 is powered on, the sensation provision mode is set to "ON". When the button 115*e* is pressed again while the sensation provision mode is set to "ON", the sensation provision mode may be set to "OFF".

(8) In Embodiment 2, the buttons 115*h* and 115*i* are provided on the side surface of the portable terminal device 100*a*, as shown in FIG. 9. The button 115*h* is the sensation shortcut start button, and the button 115*i* is the sensation shortcut end button. However, these buttons are not limited to this.

Figure 10:
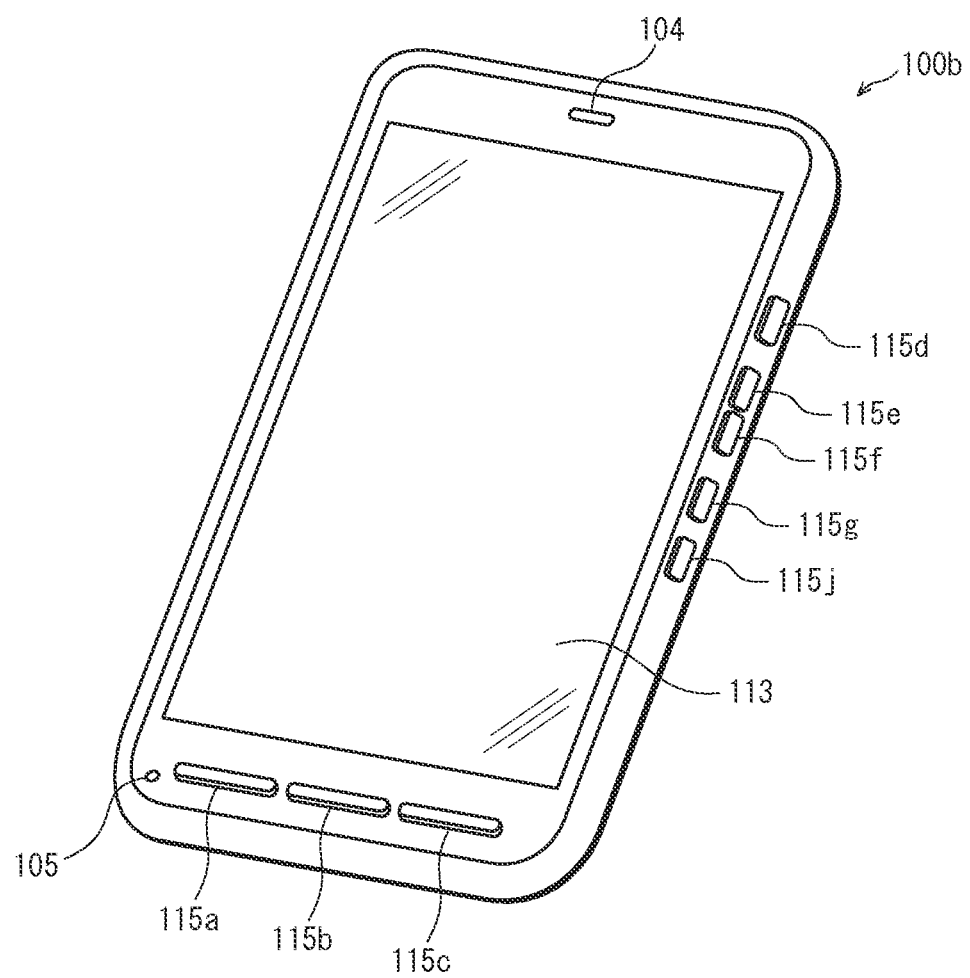
FIG. 10 is an external perspective view showing a portable terminal device 100b according to Modification.

FIG. 10 is an external perspective view showing a portable terminal device 100*b* as a modification of the portable terminal device 100*a*.

As shown in FIG. 10, the side surface of the portable terminal device 100*b* may be provided with a button 115*j* instead of the buttons 115*h* and 115*i* of the portable terminal device 100*a*. The button 115*j* is used to instruct start and end of sensation shortcut.

When the button 115*j* is pressed after the portable terminal device 100 is powered on, the sensation shortcut mode is set to "ON". When button 115*j* is pressed again while the sensation shortcut mode is "ON", the sensation shortcut mode may be set to "OFF".

(9) Each device described above may be a computer system that includes a microprocessor and a memory. The memory may store therein the computer program, and the microprocessor may operate in accordance with the computer program. Here, the computer program is composed of combinations of instruction codes each indicating an instruction to a computer so as to achieve predetermined functions.

The computer program may be recorded in a computer-readable recording medium such as a flexible disk, a hard disk, a CD-ROM, an MO, a DVD, a DVD-ROM, a DVD-RAM, a BD (Blu-ray Disc), and a semiconductor memory.

The computer program may be transmitted via data broadcasting or over a network, of which telecommunications networks, wired/wireless communications networks, and the Internet are representative.

Also, another independent computer system may implement the computer programs after the computer programs are transferred via being recorded on the recording medium, via one of the above-mentioned networks, etc.

(10) The above embodiments and modifications may be combined with one another.

4. Conclusion

As described above, an aspect of the present invention is a portable terminal device, comprising: a touch panel that detects a position of a touch, if an operator touches a display unit displaying an image, and outputs the position of the touch; a vibrator; an edge detector that detects an edge in the image; and a controller that determines whether the position of the touch corresponds with a position of the detected edge, causes the vibrator to start vibrating if the position of the touch corresponds with the position of the detected edge, and inhibits the vibrator from vibrating if the position of the touch does not correspond with the position of the detected edge.

With the above aspect, it is possible to provide a portable terminal device capable of providing the pseudo sensation to a user so that the user can operate the portable terminal device.

The portable terminal device may further comprise: an operation receiver that receives a button-pressing operation from the operator, wherein the image comprises a function object corresponding with a function of the portable terminal device, and the controller performs the function corresponding with the function object, if the operation receiver receives the operation.

With this aspect, when the user can recognize the shape of the function object through the sense of touch, the user causes the portable terminal device to perform the function corresponding with the function object by pressing the execution button. Therefore, the present invention has the advantageous effect that the user can cause the portable terminal device to perform the function even if the user uses the portable terminal device when the user cannot see the image displayed on the touch panel.

The image may comprise a function object and a first button object, the function object corresponding with a function of the portable terminal device, and the controller may perform the function corresponding with the function object, if the position of the touch corresponds with a position of an edge detected in the first button object.

With this aspect, when the user can recognize the shape of the function object through the sense of touch, the user can cause the portable terminal device to perform the function corresponding with the function object by operating the button object. Therefore, the present invention has the advantageous effect that the user can cause the portable terminal device to perform the function even if the user uses the portable terminal device when the user cannot see the image displayed on the touch panel.

The image may further comprise a second button object corresponding with a function of the display unit to display another image, and the controller may further cause the display unit to display another image, if the position of the touch corresponds with a position of an edge detected in the second button object.

With this structure, when the user can recognize the shape of the function object through the sense of touch but the function is not a desired function, a touch operation made on a button object switches the screen to another screen corresponding with the button object. Therefore, the present invention has the advantageous effect that the user can switch the screen to another screen even if the user uses the portable terminal device when the user cannot see the image displayed on the touch panel Another aspect of the present invention is a control method used by a portable terminal device. Another aspect of the present invention is a method used by a portable terminal device, the method comprising: detecting an edge in an image displayed on a display unit; receiving a position of a touch, if an operator touches the display unit; outputting the position of the touch; determining whether the position of the touch corresponds with a position of the detected edge; and causing the vibrator to start vibrating, if the position of the touch corresponds with the position of the detected edge.

With the above aspect, it is possible to control a portable terminal device so that the user can operate the portable terminal apparatus by feeling the pseudo sensation.

Yet another aspect of the present invention is a non-transitory recording medium that records therein a computer program for control that is used by a portable terminal device. Yet another aspect of the present invention is a non-transitory computer readable storage medium comprising computer-executable instructions for operating a portable terminal device, the computer-executable instructions executing a method, the method comprising: detecting an edge in an image displayed on a display unit; receiving a position of a touch, if an operator touches the display unit; outputting the position of the touch; determining whether the position of the touch corresponds with a position of the detected edge; and causing the vibrator to start vibrating, if the position of the touch corresponds with the position of the detected edge.

With the above aspect, it is possible to control a portable terminal device so that the user can operate the portable terminal apparatus by feeling the pseudo sensation.

[Industrial Applicability]

The portable terminal device pertaining to the present invention has the advantageous effect that even if the portable terminal device is used when the user cannot see an image displayed on the touch panel, the user is able to recognize the shape of the image and cause the portable terminal device to perform a function assigned to the image, and is applicable to technology for presenting information to the user through vibration produced on the display screen.

[Reference Signs List]

100, 100a portable terminal device
101 antenna
102 communications circuit
103 audio processor
104 speaker
105 microphone
106 communications controller
107 audio controller
108 main controller
109 input/output controller
110 image storage
111 edge detector
112 edge storage
113 touch panel
113a touch pad
113b display panel
114 vibrator
115 operation receiver

The invention claimed is:

1. A portable terminal device, comprising:
a touch panel that detects a position of a touch, when an operator touches a display unit displaying an image, and outputs the position of the touch, wherein the display unit simultaneously displays at least one function object and at least one button object;
a vibrator;
an edge detector that detects one or more edges of at least one object in the image; and a controller that determines whether the position of the touch corresponds with a position of at least one of the one or more detected edges of the at least one object,
when the position of the touch corresponds with the position of at least one of the one or more detected edges of the at least one object,
determines whether the at least one object is a function object or a button object, wherein a function object indicates that a user instruction is awaited in order to perform a function, and wherein a button object is assigned a function,
when the at least one object is a function object, causes the vibrator to start vibrating, and,
when the at least one object is a button object, inhibits the vibrator from vibrating and performs a function corresponding to the button object, and, when the position of the touch does not correspond with the position of at least one of the one or more detected edges of the at least one object, inhibits the vibrator from vibrating.

2. The portable terminal device of claim 1, further comprising an operation receiver that receives a button-pressing operation from the operator, wherein, when the operation receiver receives the button-pressing operation while the at least one object comprises a function object corresponding with a function of the portable terminal device, the controller performs the function corresponding with the function object.

3. The portable terminal device of claim 1, wherein, when the at least one object comprises a first button object and a function object that corresponds with a function of the portable terminal device, and the position of the touch corresponds with a position of at least one edge detected for the first button object, the controller performs the function corresponding with the function object.

4. The portable terminal device of claim 3, wherein, when the at least one object comprises the function object, the first button object, and a second button object that corresponds with a function of the display unit to display another image, and the position of the touch corresponds with a position of at least one edge detected for the second button object, the controller further causes the display unit to display the another image.

5. A method used by a portable terminal device that comprises a vibrator, the method comprising:
detecting one or more edges of at least one object in an image displayed on a display unit, wherein the display unit simultaneously displays at least one function object and at least one button object;
receiving a position of a touch, when an operator touches the display unit;
determining whether the position of the touch corresponds with a position of at least one of the one or more detected edges of the at least one object;
when the position of the touch corresponds with the position of at least one of the one or more detected edges of the at least one object,
determining whether the at least one object is a function object or a button object, wherein a function object indicates that a user instruction is awaited in order to perform a function, and wherein a button object is assigned a function,
when the at least one object is a function object, causing the vibrator to start vibrating, and,
when the at least one object is a button object, inhibiting the vibrator from vibrating and performing a function corresponding to the button object; and,
when the position of the touch does not correspond with the position of at least one of the one or more detected edges of the at least one object, inhibiting the vibrator from vibrating.

6. A non-transitory computer readable storage medium comprising computer-executable instructions for operating a portable terminal device that comprises a vibrator, the computer-executable instructions executing a method, the method comprising:
detecting one or more edges of at least one object in an image displayed on a display unit, wherein the display unit simultaneously displays at least one function object and at least one button object;
receiving a position of a touch, when an operator touches the display unit;
determining whether the position of the touch corresponds with a position of at least one of the one or more detected edges of the at least one object;
when the position of the touch corresponds with the position of at least one of the one or more detected edges of the at least one object, determining whether the at least one object is function object or a button object, wherein a function object indicates that a user instruction is awaited in order to perform a function, and wherein a button object is assigned a function, when the at least one object is a function object, causing the vibrator to start vibrating, and, when the at least one object is a button object, inhibiting the vibrator from vibrating and performing a function corresponding to the button object; and, when the position of the touch does not correspond with the position of at least one of the one or more detected edges of the at least one object, inhibiting the vibrator from vibrating.

* * * * *